United States Patent [19]

Alvarez-Sabater et al.

[11] 4,349,253

[45] Sep. 14, 1982

[54] CASSETTE ROTARY TRAY SLIDE PROJECTOR AND SLIDE CASSETTE USABLE THEREWITH

[76] Inventors: Fernando Alvarez-Sabater, P.O. Box 3628; Ilio J. Ulivi C., Apartado de Correos 1146, both of C-1010A, Caracas, Venezuela

[21] Appl. No.: 218,026

[22] Filed: Dec. 19, 1980

[51] Int. Cl.³ .................. G09F 11/30; G03B 23/02
[52] U.S. Cl. .................................................. 353/112
[58] Field of Search ............................... 353/111, 112

[56] References Cited

U.S. PATENT DOCUMENTS 4,232,953  11/1980  Alvaraz-Sabater ............... 353/111

FOREIGN PATENT DOCUMENTS 163142  of 1949  Austria ............................... 353/111

Primary Examiner—Steven L. Stephan
Attorney, Agent, or Firm—Fleit & Jacobson

[57] ABSTRACT

A slide projector and a slide cassette usable therewith for projecting slides. The slide projector includes a casing having a central hub located therein. Mechanisms for illuminating and projecting slides are located within the central hub. Also located in the central hub is a slide passage oriented generally vertically. A slide receiving tray in the casing is movable with respect to the central hub and includes a plurality of radially oriented compartments for receiving projected slides. The slide cassette containing slides to be projected has a slide storage tray rotatable with respect to a housing. The housing is releasably held in a predetermined position in the casing. The slide receiving tray is rotated by a motor so that the compartments of the slide storage tray and slide receiving tray are sequentially aligned with the inlet and outlet of the slide passage so that slides to be projected fall under the force of gravity out of the uppermost compartment, through the slide passage, and into a lowermost compartment.

9 Claims, 4 Drawing Figures

CASSETTE ROTARY TRAY SLIDE PROJECTOR AND SLIDE CASSETTE USABLE THEREWITH

BACKGROUND OF THE INVENTION

The present invention relates to slide projectors, and, in particular, to slide projectors utilizing gravity-feed during a projecting mode of operation.

U.S. Pat. No. 4,232,953, entitled "Gravity-Feed Rotary Slide Projector", describes a slide projector in which slides are transferred out of a rotary slide tray in which slides are stored in a radial orientation into registry with a projection aperture and back into the slide tray, solely by the force of gravity. The rotary slide tray is vertically arranged over a central hub portion of the slide projector that has a vertically arranged projection passage formed therein to guide movement of the slides past the projection apertures. Upon rotation of the rotary slide tray, slides radially drop from the tray under the influence of gravity into the projection passage until a sufficient number of slides accumulate in the passage to align one of the slides with the projection aperture. Sequential rotation of the tray results in passage of additional slides through the projection passage. In one embodiment, a specialized slide construction is used in which two individual slides are arranged in a carrier having like horizontal edges arranged adjacent. During a first cycle of the rotary slide tray, a first of the slides is projected, while during a second cycle the other of the slides is projected. Thus, two complete rotations of the rotary tray are required in order to project all of the slides. The patent indicates that a prismatic image inverter is required to selectively invert images when conventional single slides are projected.

BRIEF SUMMARY OF THE INVENTION

While the gravity-feed rotary tray slide projector described in U.S. Pat. No. 4,232,953 has been found to provide advantages not obtainable with previously known slide projectors, it is has been found that the slide projector described in the referenced patent has been extremely difficult to operate. The patent does not show a practical way of operating the device. Thus, this new concept basically uses a rotary slide tray split into two parts or components. A first of the components forms a slide receiving tray that is positioned within a casing of the slide projector for rotation about the central hub, while the other of the components forms a slide storage tray that is positoned in a housing releasably secured to the casing. The other component, which has compartments containing slides to be projected, is removable with its housing from the casing of the slide projector. Preferably, a plurality of blank slides are pre-positioned in the projection or slide passage of the projector and the first component so that the first slide carried by the second component falls into a projection position as soon as the compartment carrying the slide is aligned with the inlet to the slide passage. Also, the first component is provided with more compartments than the second component so that the blank slides can be accomodated in the first component.

By judiciously choosing the dimensions of the slide passage, any size slide can be projected. The only requirement is that the length of the slide passage, together with the depth of the slide retaining compartment, must be equal to a multiple of slide height so that a slide is properly positioned in the viewing position of the slide passage.

The present invention preferably employs a projection object system, which is located at the center of a hub about which the slide tray is rotatable. The lamp and condenser lens are located on one side of the slide passage and aligned with a viewing position or projection aperture, and the objective lens is located on the other side of the projection aperture or slot.

The present invention provides a slide projector in which slides are fed to a projection optics system totally by the force of gravity, and in which slides are transferred from the projection optics into either the slide receiving magazine or tray or the slide storage magazine or tray solely by the force of gravity.

The present invention also provides a gravity-feed rotary slide projector in which projection optics are arranged at the center of a hub about which a slide tray is rotatable.

Still further, the present invention provides a gravity-feed rotary tray slide projector that uses specialized double-set slides containing two slides to be projected.

Considering the present invention in more detail, its provides a slide projector for projecting slides that has a casing in which a central hub is positoned. Located within the central hub are illuminating and projecting means for illuminating and projecting a slide located in a viewing position. A slide passage is defined within the hub and has an inlet and an outlet positioned so that slides move through the slide passage solely under the force of gravity. Slide receiving means are movable with respect to said central hub to receive slides falling out of the outlet of the slide passage and to temporarily store received slides. A slide storage cassette or magazine is positionable in the casing and releaseably held in a predetermined position. The slide storage cassette has a housing and a slide storage tray movable with respect to the housing. The slide storage tray has a plurality of components arranged in an arc for receiving and storing slides to be projected. Means are provided for moving the slide storage tray with respect to the housing so that compartments of the slide storage tray are moved out of the housing into the casing and sequentially aligned with the inlet of the slide passage whereby slides fall under the force of gravity from the compartments into the slide passage. After projection of the slides, the slides fall, again under the force of gravity, into the slide storage means.

Preferably, the slide receiving means is a slide receiving tray having a plurality of compartments arranged in an arc or in a radial orientation. The slide receiving tray and the slide storage tray cooperate with each other to form a rotary slide tray.

The means for moving the compartments of the slide storage tray into the casing preferably comprises a stepping motor that, during an initial portion of a projecting mode of operation, sequentially advances the half tray forming the slide receiving tray out of the casing into the slide cassette housing. As the slide receiving tray moves into the slide cassette housing, it advances the slide storage tray out of the housing into the projector casing. The arrangement of the slide receiving tray and slide storage tray are such that the motor, after a certain period of operation, engages the slide storage tray so that the motor advances the slide storage tray into the projector casing. As the motor advances the slide storage tray, the slide storage tray forces the slide receiving tray out of the casing into the housing. With one embodiment of the invention, during a projecting mode of operation, slides fall out of compartments in the slide storage tray into the slide passage and fall out of the slide passage into a compartment of the slide receiving tray. After the projecting mode has been completed, continued rotation about the central hub results in slides falling out of the slide receiving tray into the slide storage tray so that the slide storage tray is reloaded.

The present invention can be used with a holder containing two slides arranged with like horizontal edges adjacent to each other. The double slides can completely fill the slide storage tray so that the half slide tray, in effect, provides the storage capacity of a full rotary slide tray.

The foregoing and other advantages provided by the present invention will become more apparent in the detailed description of the preferred embodiments hereinafter presented.

BRIEF DESCRIPTION OF THE DRAWINGS

In the detailed description of the preferred embodiments of the invention hereinafter presented, reference is made to the accompanying drawings, in which.

DESCRIPTION OF THE PREFERRED EMBODIMENTS

Because slide projectors are well-known, the present invention will be directed, in particular, to elements forming part of, or cooperating more directly with, the present invention. Elements not specifically shown or described herein are understood to be selectable from those known in the art.

In the following description, the term "slides" will be used to identify positive photographic transparencies held in a mount. The terminology "slides" will also be used to identify any sort of information that is intended to be illuminated and projected for viewing purposes. The term "slides" encompasses both conventional single slides and double slides hereinafter described in more detail.

Figure 1:
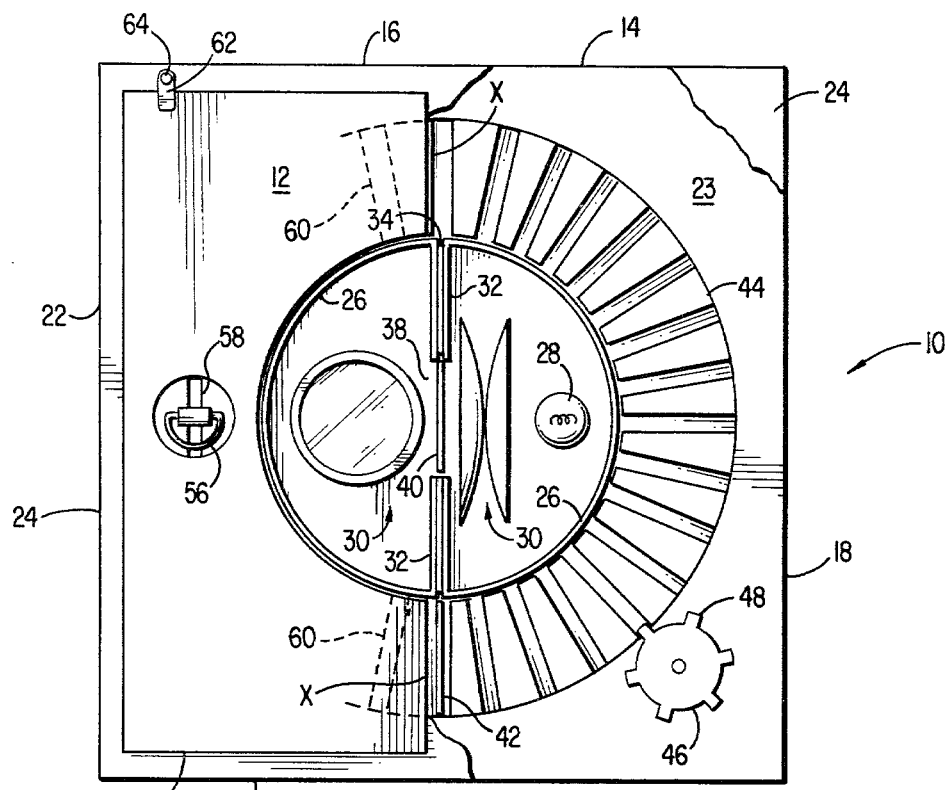
FIG. 1 is a schematic front plan view, partially broken away, of one embodiment of a slide projector according to the present invention.
Figure 2:
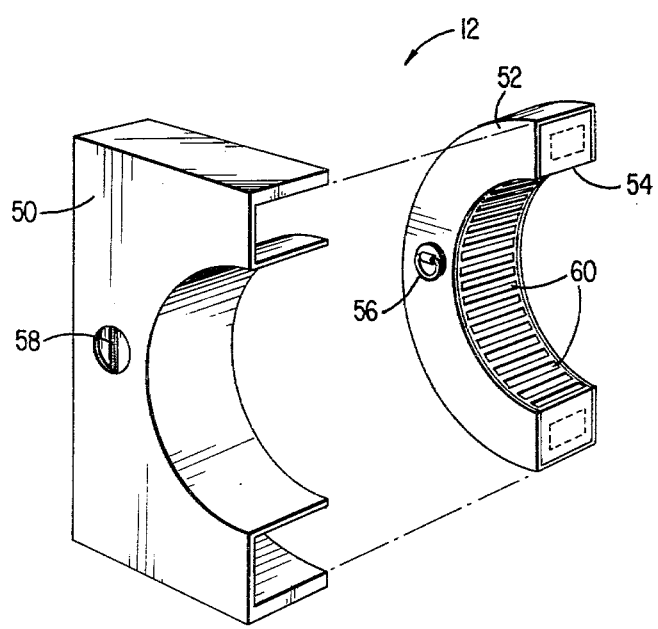
FIG. 2 is an exploded perspective view of one embodiment of a slide cassette usable with the projector of FIG. 1.

Referring now to the drawings, and to FIGS. 1 and 2 in particular, one embodiment of a slide projector according to the present invention, generally designated 10, and one embodiment of a slide cassette, generally designated 12, usable with the projector 10 are illustrated.

The slide projector 10 has a casing 14 with side walls 16, 18, 20, and 22 interconnected by a bottom wall and a front wall, a portion of which designated 24 is illustrated in FIG. 1. A central hub 26 is disposed within the casing 14. A projection light source or illuminating means 28 and a projecting or projection optic means, generally designated 30, are disposed within the central hub. Preferably, the projecting means includes a mirror system oriented in such manner that an illuminated slide is projected through a lens located in an opening formed in the front wall 24. A slide passage 32 is formed within the central hub and has an inlet 34 and an outlet 36. Preferably, the slide passage is vertically oriented. Intermediate its ends, the slide passage has a projection aperture or opening formed therein that is in alignment with the optical axis of the projecting means and defines a viewing position 38 for a slide 40 to be projected. While FIG. 1 illustrates a small gap between adjacent slides 40 located in the slide passage 32, it should be appreciated that upper slides rest on lower slides and that the distance from the bottom of the viewing position 38 to the bottom of a compartment 42 aligned with the outlet 36 is an even multiple of the length of slides being projected.

The casing 14 is designed in such manner that the bottom can be connected to a vertical surface or one of the side walls can be positioned on a horizontal surface during projection of slides.

Disposed within the casing 14 is slide receiving means. Preferably, the slide receiving means comprises a slide receiving tray 44 having a plurality of compartments 42 arranged in an arc or radial orientation about the central hub 26. A stepping motor 46 has a plurality of projections 48 radially spaced from each other by distance equal to the distance between adjacent compartments 42 in such manner that rotation of the stepping motor 46 results in one of the projections 48 engaging an outer end of one of the compartments 42 to thereby rotate the slide receiving tray 44 to position another compartment 42 in alignment with the outlet 36 of the slide passage 32.

Considering now FIG. 2, the slide cassette 12 has a housing 50 that at least partially encompasses a slide tray 54. In the embodiment illustrated in FIG. 2, the slide tray 54 has an outer casing or frame 52 that covers three sides of a slide storage tray 54. The frame 52 has a ring 56 attached to a side surface thereof that is insertable through a slot 58 formed in a side wall of the housing and is rotatable to releasably interconnect the frame with the housing. The slide tray, which has a plurality of compartments 60 similar to the compartments 42, is movable into and out of the frame 52.

Means are provided for releasably holding the slide cassette 12 in a predetermined position in the casing 10. For instance, as illustrated in FIG. 1, a plurality of latch members 62 are pivotable about shafts 64 carried by the front wall 24. Alternatively, leaf springs can be positioned on portions of the casing 14 defining the recess receiving the slide cassette 12. Also, either the walls defining the recess or the walls of the housing 50 can be biased or sized in such manner that there is a friction fit between the cassette and projector casing. Still further, male and female-type connectors can be carried by the cassette housing and projector casing.

While FIG. 2 illustrates a frame 52 holding the slide tray 54, it will be appreciated that no frame is required. For instance, a friction fit can be provided between the housing 50 and slide tray 54. Alternatively, the open side of the housing 50 has at least one latch member for releasably retaining the slide storage tray within the housing 50. It will be appreciated that with either of the preceding the ring 56 is either connected to the housing 50 or positioned in a recess in the slide tray so that the ring does not interfere with rotary movement of the slide tray into and out of the housing.

To prevent objectionable illumination escaping from the casing 14, it is preferable that the slide passage 32 always be filled with slides. Thus, the first compartment of slide receiving tray 44 has a slide disposed therein and additional slides are disposed in the slide passage 32 to fill the passage prior to insertion of the slide cassette 12 into the casing 14. Also, the storage magazine or slide tray is larger than and has more compartments than the supply cassette. For instance, as illustrated in FIG. 1, confronting ends of the storage and supply cassettes confront each other along lines "x".

Figure 3:
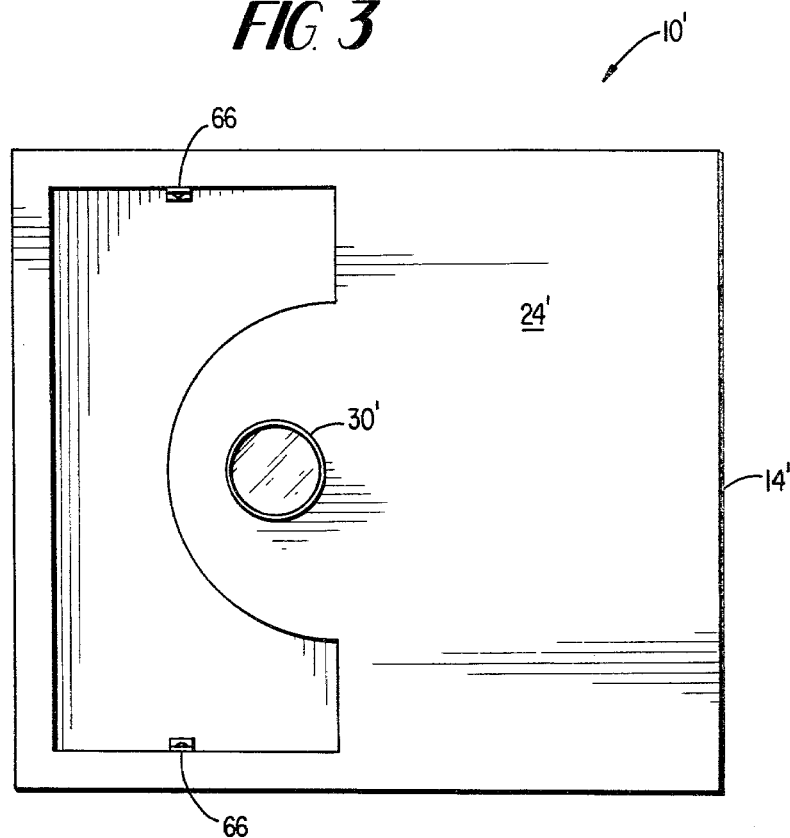
FIG. 3 is a schematic front plan view of a modification of the projector of FIG. 1, with the slide storage cassette removed.

Referring now to FIG. 3, a modification of the casing of the embodiment of FIG. 1 is illustrated. Since the casing illustrated in FIG. 3 is similar to that illustrated in FIG. 1, the same reference numerals, with a prime attached, have been used to identify the structure illustrated in FIG. 3. FIG. 3 illustrates a slide projector 10' having a casing 14' with a recess formed therein for receiving a slide cassette. Leaf springs 66 are positioned on side walls of the recess. The springs are resiliently engageable with side walls of a slide cassette housing positioned in the recess to releasably secure the cassette to the casing. A lens of projection optics means 30' is positioned in an aperture formed in the front wall 24' of the casing 14'. From FIG. 3, it can be seen that the external configuration of the slide projector provided by the present invention provides a relatively clean and aesthetically pleasing appearance.

Figure 4:
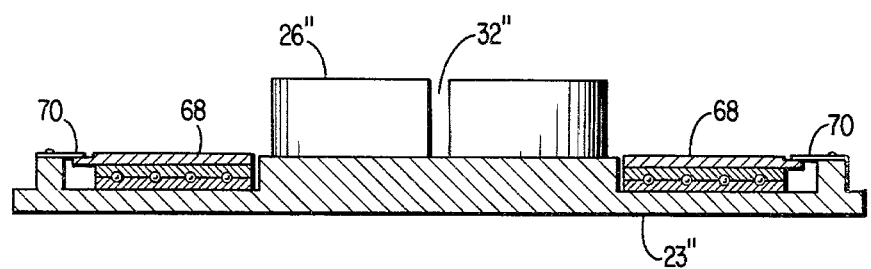
FIG. 4 is a schematic partial side view of another modification of the projector of FIG. 1.

FIG. 4 illustrates another modification of the embodiment illustrated in FIG. 1. With this embodiment, the same reference numerals, with a double prime attached, have been used to identify components similar to those previously discussed. In FIG. 4, a portion of a slide projector 10" is illustrated in which a central hub 26" is connected to a bottom wall 23" of a casing. A slide passage 32" is defined within the central hub. A rotatable support platform 68 encompasses the central hub 26". The support platform 68 is designed to provide support for a slide storage tray similar to slide tray 54 and support for a slide receiving tray similar to slide receiving tray 44 during their rotation about the central hub. Latch elements 70 releasably secure the support platform 68 to the bottom wall 23".

Considering now the operation of the present invention, slides to be projected are loaded into the slide storage cassette 12. To accomplish such loading, the slide storage tray 54 and frame 52 are removed from the slide tray housing 50. The slide storage tray 54 and frame 52 are separated from each other and individual slides are inserted into the individuals compartments 60. The slide tray is then inserted into the frame 52 and the tray and frame is inserted into the housing 50 and the ring 56 is rotated with respect to the slot 58 to releasably interconnect the slide tray frame 52 with the housing 50. The loaded cassette 50 is then positioned in and releasably secured to the projector casing 14. Preferably, three blank slides are positioned in the slide passage 32 and a fourth blank slide is positioned in the bottommost compartment 42 in the slide receiving tray 44. Energization of motor 46 results in clockwise rotation of the slide receiving tray so that its leading lower end engages the trailing lower end of the slide storage tray 54 thereby rotating the upper leading end of the slide storage tray out of the housing 50 into the casing 14. Such movement results in the first compartment 60 of the slide storage tray 54 being aligned with the inlet 34 of the slide passage 32. The slide in the compartment 60 falls under the force of gravity into the slide passage. When the motor 46 is again energized to rotate the storage means 44, the first slide falls into the viewing position 38 in alignment with the optical axis of the projection optic means 30. It will be appreciated that the motor 46 can be either manually energized to control the projection time or can operate continuously so that each slide is projected for a predetermined time period. During continued rotation of the slide trays, the slide in the compartment 60 of the slide storage tray 54 coming into alignment with slide passage falls into the entrance or inlet of the slide passage, while the slide in the bottom of the slide passage falls into a compartment 42 of the slide receiving tray. Upon completion of a rotary movement of 180°, the slides contained in the storage tray 54 will have been projected, and the storage tray 54 will be located within the casing 14. The last projected slides will still be in the slide passage 32. The slide receiving tray 44 will be positioned within the slide tray housing 50 and will contain both the slides initially stored in the projection passage and all of the slides originally contained in slide tray 54, except for those in the slide passage. Preferably, the tray 44 has more compartments than the tray 54 so that all of the projected slides can be received in the tray 44.

After the projecting mode has been completed, continued rotation about the central hub results in slides falling out of the slide receiving tray into the slide storage tray so that the slide storage tray is reloaded.

It is understood, of course, that the foregoing description is presented by way of example only and is not intended to limit the scope of the present invention. Various other embodiments are contemplated by the present invention. The only limitations intended to the present invention are set forth in the appended claims.

What is claimed is:

1. A cassette rotary tray slide projector for projecting slides comprising:

a casing;

a central hub within said casing;

illuminating and projecting means within said central hub for illuminating and projecting slides located in a viewing position defined within said central hub;

slide passage defining means located in said central hub for defining a slide passage having an inlet and an outlet positioned so that slides, under the force of gravity, enter the inlet, pass the viewing position, and leave the slide passage through the outlet;

slide receiving means movable with respect to said central hub for receiving slides from the slide passage outlet and for temporarily storing received slides;

a slide cassette separate from said slide receiving means and removably held in a predetermined position in said casing, said slide cassette having a housing and a slide storage tray movable with respect to said housing, said slide storage tray having a plurality of compartments arranged in an arc for receiving and storing slides to be projected;

means having a component carried by one of said slide cassette and said casing for releasably holding said slide cassette housing in a predetermined position in said casing; and means for moving said slide tray with respect to said housing so that said compartments are moved out of said housing into said casing and sequentially aligned with the inlet of said slide passage whereby slides fall under the force of gravity out of said compartments into the slide passage, pass through the slide passage, and are received in said slide receiving means.

2. A slide projector according to claim 1, wherein said slide receiving means comprises a slide receiving tray having a plurality of compartments arranged in an arc, said slide storage tray and said slide receiving tray cooperating with each other to form a rotary slide tray.

3. A slide projector according to claim 2, wherein said means for moving comprises means for sequentially moving one of said slide storage and slide receiving trays out of said casing into said housing so that movement of the one of said trays into said housing sequentially advances the other of said trays into said casing to align the compartments thereof with said slide passage inlet.

4. A slide projector according to claim 2, wherein the length of said slide passage is longer than the length of a slide to be projected so that a slide in the viewing position rests upon at least one other slide in the slide passage, the at least one other slide resting on a slide held in one of said compartments of one of said slide trays.

5. A slide projector according to claim 4, further comprising a plurality of slides positioned in said slide receiving tray and said slide passage prior to start of a projection mode of operation so that the first slide entering said slide passage from said slide storage tray automatically falls into the viewing position.

6. A slide projector according to claim 2, wherein said slide receiving tray contains more compartments than said slide storage tray.

7. A cassette rotary tray slide projecting apparatus comprising:
a casing;
a central hub mounted in said casing, said central hub having a vertically arranged slide passage with an inlet and an outlet;
a projection light source mounted within said central hub on one side of said slide passage;
projection optic means having at least one component positioned on the other side of said slide passage, said slide passage having a projection aperture formed therein aligned with the optical axis of said projection optic means;
slide receiving means having a plurality of compartments formed therein for holding slides, said slide receiving means being rotatable about said central hub to align one of said compartments with said slide passage;
a slide cassette separate from said slide receiving means and having a housing and a slide storage tray with a plurality of compartments formed therein for holding slides to be projected, the slide storage tray being movable out of said housing into said casing to align one of said compartments with said slide passage;
means for releasably holding said slide cassette housing in a predetermined position in said casing so that said slide storage tray is rotatable about said central hub; and
means for rotatably moving one of said slide tray and said slide receiving means so that respective compartments of said slide tray and said slide receiving means are sequentially aligned with said slide passage whereby one slide falls out of one of said compartments of one of said slide tray and said slide receiving means into said slide passage inlet and another slide falls out of said slide passage outlet into another of said compartments of said slide tray and said slide receiving means.

8. A slide projecting apparatus according to claim 7, wherein said slide receiving means contains more compartments than said slide storage tray.

9. A slide cassette for use with a slide projector having slide receiving means with a plurality of compartments arranged in an arc, a central hub having a vertically oriented slide passage and illuminating and projecting means for illuminating and projecting a slide located in a viewing position in the slide passage, and means for rotating the slide receiving means about the central hub, said slide cassette comprising:
a housing positionable in a predetermined position in the slide projector, and
a slide storage tray positioned in said housing and having a plurality of compartments arranged in an arc for receiving and storing slides to be projected, said slide storage tray being movable out of said housing into said slide projector and said slide receiving means being movable into said housing upon rotation of said slide receiving means so that compartments of said slide storage tray and said slide receiving means are sequentially aligned with the inlet and outlet of said slide passage whereby slides fall from one of said compartments into the inlet of said slide passage and fall out of the outlet of said slide passage into another of said compartments.

* * * * *